(No Model.)
M. POTTER.
FAUCET.
No. 464,689.      Patented Dec. 8, 1891.
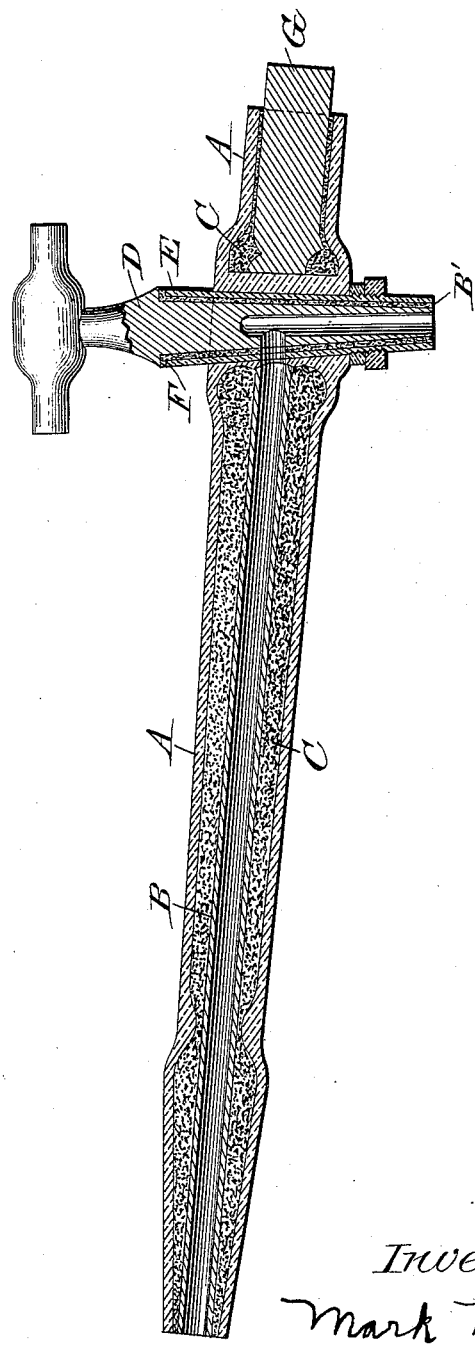
Witnesses:
Thomas F. Quigley.
M. Pakelnis Wey
Inventor:
Mark Potter
by F. H. Gibbs
his Atty.

UNITED STATES PATENT OFFICE.

MARK POTTER, OF SYRACUSE, NEW YORK.

FAUCET.

SPECIFICATION forming part of Letters Patent No. 464,689, dated December 8, 1891.

Application filed January 14, 1890. Renewed May 27, 1891. Serial No. 394,296. (No model.)

*To all whom it may concern:*

Be it known that I, MARK POTTER, of Syracuse, in the county of Onondaga, in the State of New York, have invented new and useful Improvements in Faucets, of which the following, taken in connection with the accompanying drawing, is a full, clear, and exact description.

This invention relates to improvements in metal faucets for drawing beer, malt liquors, and other liquids; and it consists in certain peculiarities of detail construction, all as hereinafter particularly pointed out in the claims.

In general a wooden faucet is preferred for drawing malt liquors; but a faucet made of wood is not sufficiently strong to stand the hard usage to which it is of necessity subjected in use where it is driven into and taken from a large number of casks or receptacles in a short time.

On account of the foregoing objection wooden faucets are costly and unhandy in use, as they are liable to split and break and spill the contents of a cask; but many persons will not drink malt liquors when drawn through metal pipes, and to produce a faucet which will possess all the strength of a metallic structure, at the same time having a wooden way or liquid-passage, is the object sought by my invention. To that end I have produced a metal faucet which is provided with a wooden lining or way in which the liquid passes without coming in contact with the main body of the faucet of metal.

In the annexed drawing similar letters of reference indicate corresponding parts, the view shown being a longitudinal vertical section of a faucet provided with my improvement, in which—

A is a shell of metal.

B is the wooden way or lining, extending from the rear end to the discharge. The wooden way is held in the main shell by means of cement C, which is filled into the space between the said way and shell to securely retain the said wooden way in position therein. This space C is filled with a plastic self-hardening cement, which when hard is impervious to moisture and acids and acts as an elastic packing between the shell A and way B and gives strength and elasticity to the structure.

In the drawing, D is a wooden spigot, which is provided with a metallic shell E, held in place by a cement packing F, as shown.

At the forward end my faucet is formed hollow, and in the place thus left I insert the pounding-plug G, which is held in place by means of the cement packing C, which surrounds the same.

The spigot is provided at its lower end with the usual washer and nut to secure it in position and compensate for any wear incident to use.

By reference to the drawing it will be readily apparent that I have produced a faucet which possesses the strength of an ordinary metal faucet and at the same time allows the malt liquors to be drawn through wood, thus avoiding the unpleasant effects of ordinary metallic faucets.

In practice the hollow shell A is first cast and the way B held therein and the space between the shell and way filled with cement C in a plastic condition. This cement soon hardens and the parts are held firmly together.

The key or spigot turns in the metallic portion or seat A', which is made tapering to correspond thereto, and the opening or way B' in the spigot is formed in the wood to form a continuation of the wooden way B of the main body of the faucet.

I am aware that wooden faucets have been made with a metallic shell cast onto the wooden body, and that bands and re-enforce pieces have been added to wooden faucets by casting and shrinking the same on the body of the same; also that metal tubes have been inserted in wooden faucets. These I do not claim, as they do not accomplish the object of my invention.

By my invention I am enabled to produce a cast-metal shell of hard tough metal which will resist the strain incident to rough usage to the same extent as a faucet entirely of metal and at the same time have a wooden passage through which the liquids will pass, thus producing a faucet which will outwear several faucets of wood, with a thin coat of metal shrunk or cast on the exterior thereof for an exterior coating.

What I claim as my invention is—

1. A metallic faucet provided with a wood lining or way secured in position by a suitable cement packing and provided with a wooden spigot surrounded by a metallic shell held thereto by a cement packing, substantially as shown.

2. A metallic faucet having a continuous longitudinal wood lining extending from the rear end to the spigot, in combination with a wooden spigot protected by a metallic shell, the lining of the body and spigot portions both being held in position by means of a suitable cement packing which is impervious to moisture, all combined substantially as and for the purpose specified and shown.

In testimony whereof I have hereunto signed my name, in the presence of two attesting witnesses, at Syracuse, in the county of Onondaga, in the State of New York, this 4th day of January, 1890.

MARK POTTER.

Witnesses:
FREDERICK H. GIBBS,
D. P. COWL.